United States Patent
Lundstrom

(10) Patent No.: US 10,618,112 B2
(45) Date of Patent: *Apr. 14, 2020

(54) GRANULATION OF MOLTEN MATERIAL

(71) Applicant: UVAN HOLDING AB, Taby (SE)

(72) Inventor: Per-Ake Lundstrom, Taby (SE)

(73) Assignee: UVAN HOLDING AB, Taby (SE)

( * ) Notice: Subject to any disclaimer, the term of this patent is extended or adjusted under 35 U.S.C. 154(b) by 632 days.

This patent is subject to a terminal disclaimer.

(21) Appl. No.: 14/914,535

(22) PCT Filed: Sep. 4, 2014

(86) PCT No.: PCT/SE2014/051016
§ 371 (c)(1),
(2) Date: Feb. 25, 2016

(87) PCT Pub. No.: WO2015/034425
PCT Pub. Date: Mar. 12, 2015

(65) Prior Publication Data
US 2016/0199915 A1    Jul. 14, 2016

(30) Foreign Application Priority Data

Sep. 5, 2013 (EP) ...................................... 13183062
Mar. 31, 2014 (SE) ....................................... 1450379

(51) Int. Cl.
*B22F 9/10* (2006.01)
*B22F 1/00* (2006.01)
(Continued)

(52) U.S. Cl.
CPC .............. *B22F 9/08* (2013.01); *B22F 1/0014* (2013.01); *B22F 9/10* (2013.01); *C21B 3/08* (2013.01);
(Continued)

(58) Field of Classification Search
CPC ........ B22F 1/0007; B22F 1/0014; B22F 9/08; B22F 9/10; B22F 2009/0804; C21B 3/08;
(Continued)

(56) References Cited

U.S. PATENT DOCUMENTS 3,442,988 A     5/1969   Williams
3,719,732 A     3/1973   Diffenbach et al.
(Continued)

FOREIGN PATENT DOCUMENTS

CN        88204942 U    12/1988
CN        1201413 A     12/1998
(Continued)

OTHER PUBLICATIONS

Chinese Office Action dated Oct. 19, 2016 for Chinese Patent Application No. 201480054550.
(Continued)

*Primary Examiner* — Scott R Kastler
*Assistant Examiner* — Michael Aboagye
(74) *Attorney, Agent, or Firm* — Karceski IP Law, PLLC

(57) ABSTRACT

A granulated material having an improved size distribution and a method and apparatus for the production of such a granular material where the grain size and grain size distribution is controlled by the use of a rotating distributor. The rotating distributor includes an upper inlet opening, sidewalls, a bottom and at least one row of openings at the lower end of the sidewalls. The openings in the sidewalls have a size of at least 5 mm in the smallest dimension.

9 Claims, 6 Drawing Sheets

(51) Int. Cl.
*B22F 9/08* (2006.01)
*C21B 3/08* (2006.01)
*C22C 33/02* (2006.01)
*C21C 7/00* (2006.01)

(52) U.S. Cl.
CPC .. *C22C 33/0285* (2013.01); *B22F 2009/0804* (2013.01); *B22F 2304/15* (2013.01); *C21B 2400/024* (2018.08); *C21B 2400/072* (2018.08); *C21C 7/0037* (2013.01); *Y02P 10/216* (2015.11)

(58) Field of Classification Search
CPC ........ C21B 2400/024; C21B 2400/072; C21C 7/0037; C22C 33/0285
USPC ........... 266/202, 204, 236; 164/437; 75/334, 75/338, 340, 342, 355, 331; 264/8, 5, 7, 264/11, 14
See application file for complete search history.

(56) References Cited

U.S. PATENT DOCUMENTS

| | | | |
|---|---|---|---|
| 3,761,548 A | 9/1973 | Winter et al. | |
| 3,888,956 A * | 6/1975 | Klint | B01J 2/04 75/331 |
| 4,348,340 A * | 9/1982 | Gagneraud | B01J 2/04 264/8 |
| 4,373,883 A | 2/1983 | Tachimoto et al. | |
| 4,402,884 A * | 9/1983 | Koike | C22C 33/0207 264/8 |
| 5,017,218 A | 5/1991 | Lundstrom et al. | |
| 5,332,198 A * | 7/1994 | Yeh | B22F 9/10 164/437 |
| 6,287,362 B1 | 9/2001 | Levey et al. | |
| 9,556,374 B2 * | 1/2017 | Yamada | C09K 5/08 |
| 2018/0029133 A1 * | 2/2018 | Lundstrom | B29C 48/92 |

FOREIGN PATENT DOCUMENTS

| | | | |
|---|---|---|---|
| CN | 2361412 Y | 2/2000 | |
| CN | 1257767 A | 6/2000 | |
| CN | 1532012 A | 9/2004 | |
| CN | 101412114 A | 4/2009 | |
| CN | 101612666 A | 12/2009 | |
| CN | 102076580 A | 5/2011 | |
| EP | 0402665 A2 | 12/1990 | |
| EP | 0522844 A2 | 1/1993 | |
| EP | 1493517 A2 | 1/2005 | |
| GB | 981182 | 1/1965 | |
| GB | 1165794 | 10/1969 | |
| JP | H04337017 A | 11/1992 | |
| JP | 2000073109 A | 3/2000 | |
| SU | 1109265 A1 | 8/1984 | |
| WO | WO 2009157857 A1 | 12/2009 | |

OTHER PUBLICATIONS

European Office Action dated Dec. 18, 2017, for European Patent Application No. 14842554.9.
P Vesterberg et al., "Granulation of Ferroalloys—Results from Industrial Operations and Comparative Study on Fines Generation," Jun. 12, 2013, Infacon XIII, Almaty, Kazakhstan.
Pekka Niemela et al., "Production, Characteristics and Use of Ferrochromium Slags," Proceedings of the 11th International ferroalloy congress, New Dehli, India, Jan. 1, 2007, pp. 171-179.
European Communication dated Mar. 6, 2017, for European Patent Application No. 14842554.9.
Chinese Office Action dated Mar. 22, 2017, for Chinese Patent Application No. 201480054550.
Eurasion Office Action dated Mar. 23, 2018, for Russian Patent Application No. 201690453/31.
Chinese Office Action dated Sep. 15, 2017, for Chinese Patent Application No. 201480054550.
International Search Report and Written Opinion dated Oct. 24, 2014, for International Patent Application No. PCT/SE2014/051016.
Extended European Search Report dated Sep. 2, 2016, for European Patent Application No. 14842554.9.
Indian Patent Office Action dated Jan. 29, 2020, for Indian Patent Application No. 201647011554.

* cited by examiner

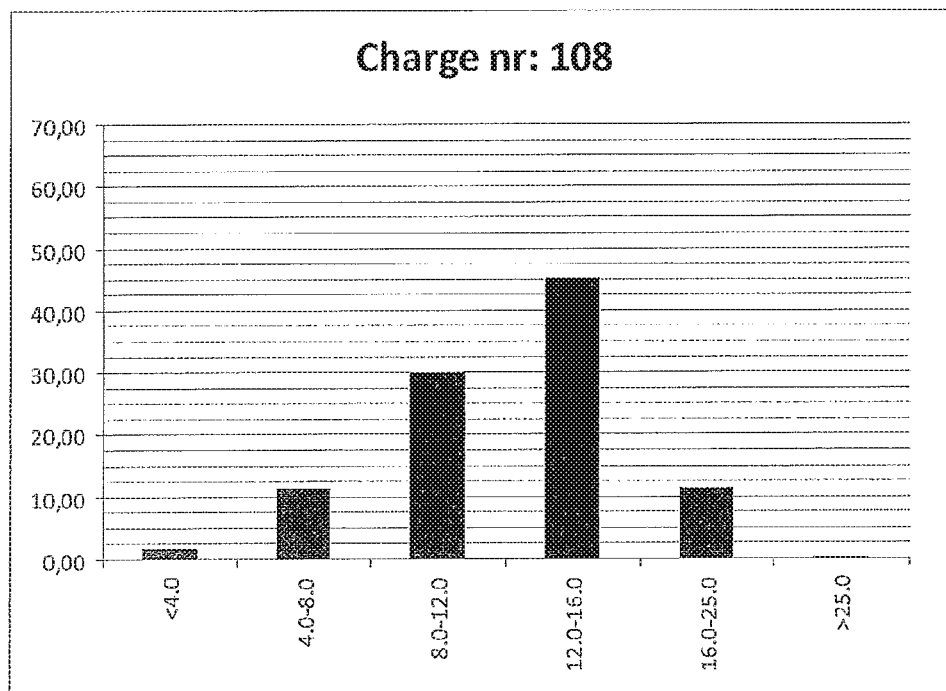
Figure 3. Example 1. Size distribution according to the invention.
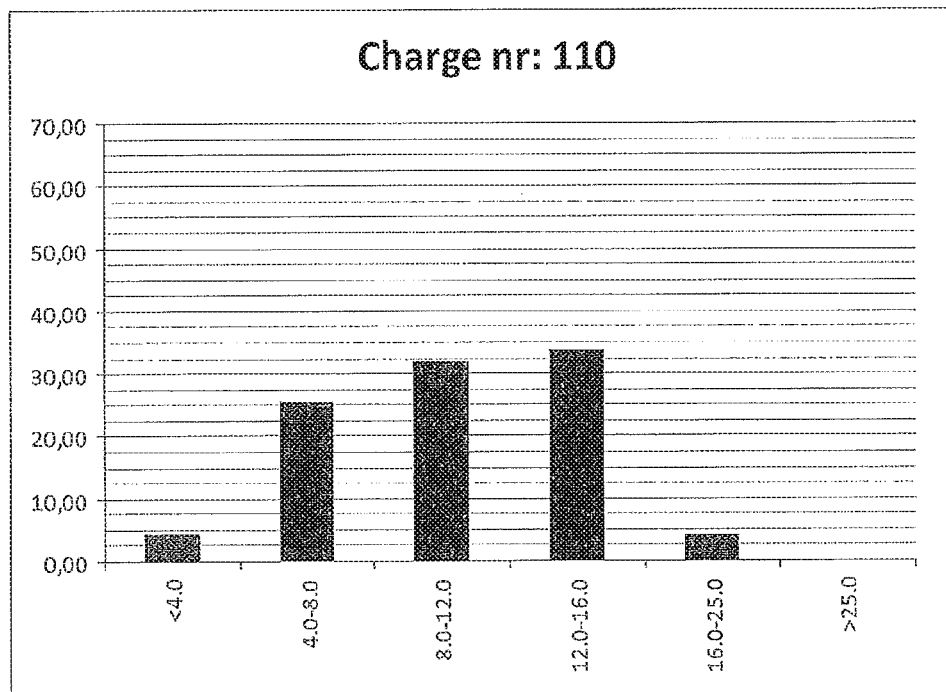
Figure 4. Example 1. Size distribution according to the prior art.

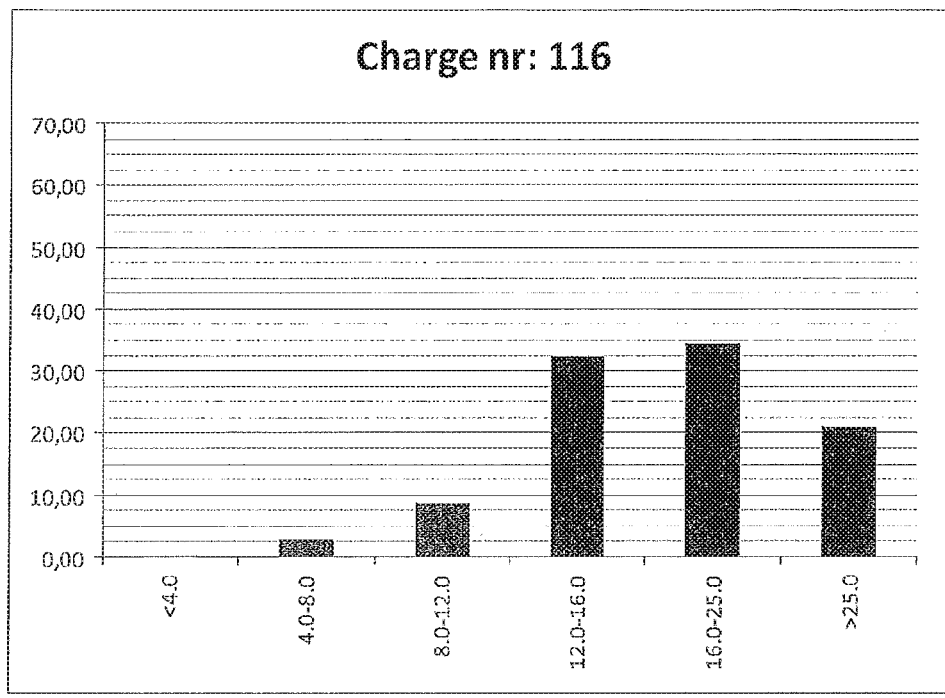
Figure 5. Example 2. Size distribution according to the invention.
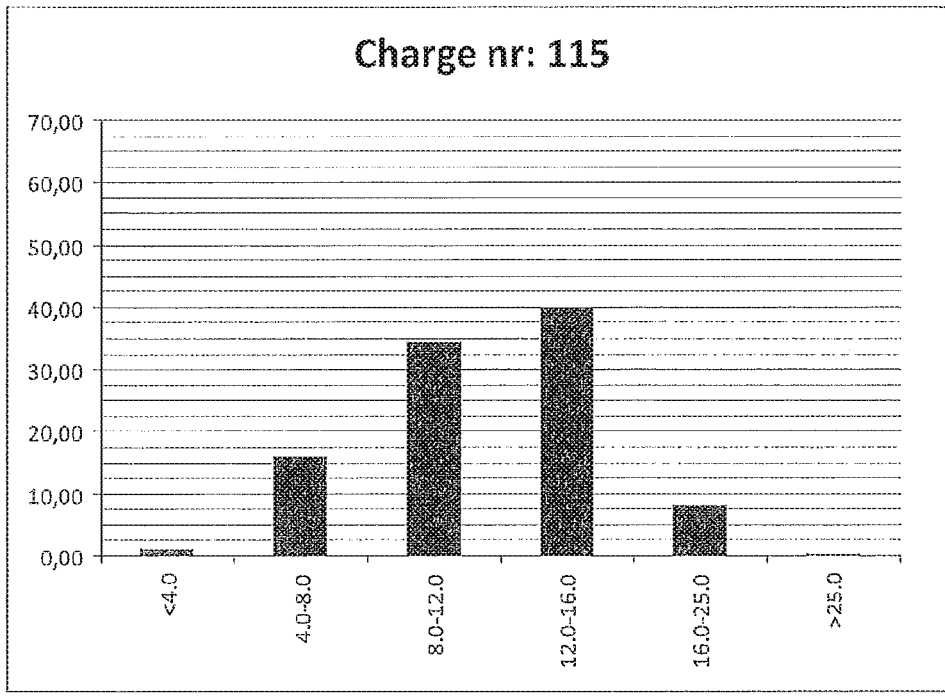
Figure 6. Example 2. Size distribution according to the prior art.

GRANULATION OF MOLTEN MATERIAL

CROSS-REFERENCE TO RELATED APPLICATION(S)

This is a National Stage Entry into the United States Patent and Trademark Office from International PCT Patent Application No. PCT/SE2014/051016, having an international filing date of Sep. 4, 2014, which claims priority both to European Patent Application No. 13183062.2, filed Sep. 5, 2013, and to Swedish Patent Application No. 1450379-1, filed Mar. 31, 2014, the entire contents of all of which are incorporated herein by reference.

TECHNICAL FIELD

The invention relates to a granulated material having an improved size distribution and a method and apparatus for the production of such a granular material.

BACKGROUND OF THE INVENTION

Metal granulation in water is a well-established method for rapid solidification of liquid metal into a medium sized product form. The Granshot® process has been developed for the direct production of ready to use material for the steel industry. The known apparatus is disclosed in FIG. 1. The molten metal is directed from a tundish to a refractory target, which is denoted spray head in FIG. 1. The metal strikes the target, split up and is radially distributed over the cooling water in the tank. The droplets solidify in the tank and are recovered from the bottom of the tank. The size of the granules depends on several factors such as melt composition and impact conditions. The main fraction obtained lies within the size range of 5-25 mm. However, the amount of fines defined as the granules having a maximum dimension of ≤8 mm may be as high as 20%. The principles of this method are disclosed in EP 402 665 and U.S. Pat. No. 3,888,956.

U.S. Pat. No. 4,402,884 discloses a method of granulating using a rotating disc. The main part of the granules obtained according to this method has a size of less than 10 mm.

Although the grain sizes obtained by the above mentioned method allow a rapid dissolution of the granular metal in a steel melt there is a drawback in that there are limited possibilities to adjust the mean grain size and the grain size distribution.

EP 522 844 discloses a method of producing metal granules by pouring a metal stream into a liquid cooling bath. U.S. Pat. No. 6,287,362 discloses a method of producing metal lumps having a characteristic dimension of 20-100 mm by introducing a molten metal stream into a stream of water. Drawbacks associated with these methods are long dissolution times for the coarse material and a wide particle size distribution.

SUMMARY OF THE INVENTION

The general object of the present invention is to provide a granulated material having an improved size distribution.

Another object is to provide an apparatus and a method for making such an improved granulated material. In particular, it should be possible to obtain a mean size that allows a rapid dissolution, when the material is added to a melt.

It is also an object to further improve the Granshot® process in order to provide a material having a more narrow size distribution of the granules obtained. This and other objects are achieved by means of the apparatus, method and product discussed herein.

Acicular-shaped, aluminium alloy granules are excluded from the invention.

Further advantageous embodiments of the invention are discussed herein.

According to the invention, the granulation is performed with the aid of a rotating distributor which comprises an upper inlet opening, sidewalls, a bottom and at least one row of openings at the lower end of the sidewalls, wherein the openings in the sidewalls have a size of at least 5 mm in the smallest dimension.

BRIEF DESCRIPTION OF THE FIGURES

In the following, the invention will be described in more detail with reference to the preferred embodiments and the appended drawings.

FIG. 3 discloses the size distribution of the granules of the invention obtained in Example 1 wherein the ferronickel contained 32% Ni and 0.1% Si.

FIG. 4 discloses the size distribution of the granules of the comparative method wherein the ferronickel contained 32% Ni and 0.1% Si.

FIG. 5 discloses the size distribution of the granules of Example 1 wherein the ferronickel contained 32% Ni and 0.27% Si.

FIG. 6 discloses the size distribution of the granules of the comparative method wherein the ferronickel contained 32% Ni and 0.27% Si.

DETAILED DESCRIPTION OF THE INVENTION

Figure 1:
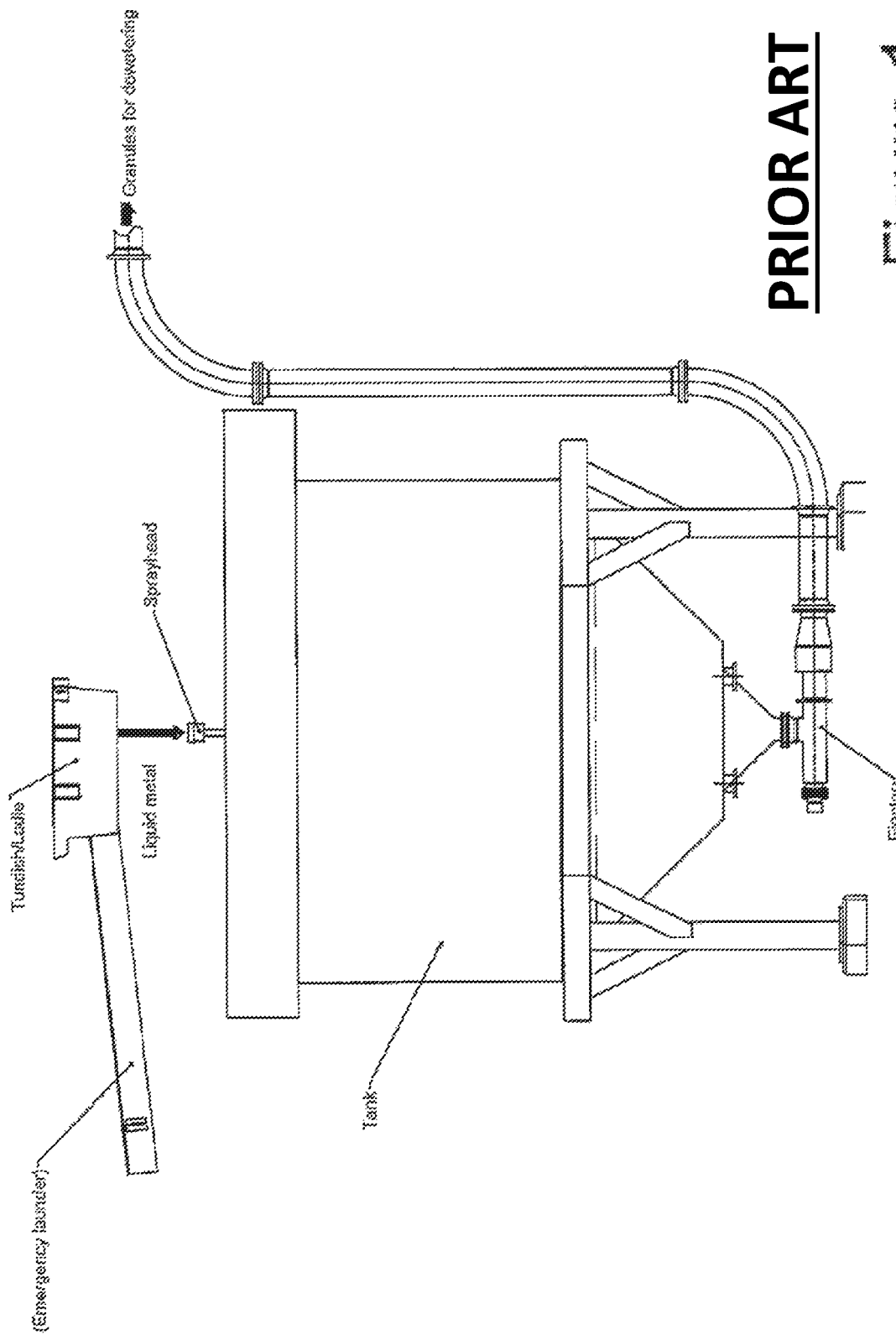
FIG. 1 is a schematic drawing of the apparatus used in the Granshot® process.

The present invention will now be described in detail with reference to the attached drawings.

The apparatus 10 for producing the granulated material 12 comprises:
a) a cooling tank 14 containing a cooling fluid 16,
b) a means for feeding 18 (a.k.a., a feeder) the liquid material to a rotating distributor 20,
c) a rotating distributor 20 positioned above the cooling tank 14,
the rotating distributor 20 comprises an upper inlet opening 22, sidewalls 24, a bottom 26 and at least one row of openings 28 at the lower end of the sidewalls 24, wherein the openings 28 in the sidewalls 24 have a size of at least 5 mm in the smallest dimension.

The means for feeding 18 the liquid material to the rotating distributor 20 is positioned above the tank 14, preferably the tank 14 is provided with cylindrical sidewalls 30 and the feeding means 18 is positioned at the centreline of said cylindrical sidewalls 30. The distributor 20 may be made of a non-metal refractory material, like alumina, magnesia or dolomite. In particular, the distributor 20 is made of ceramic when granulating ferrometals.

Figure 2:
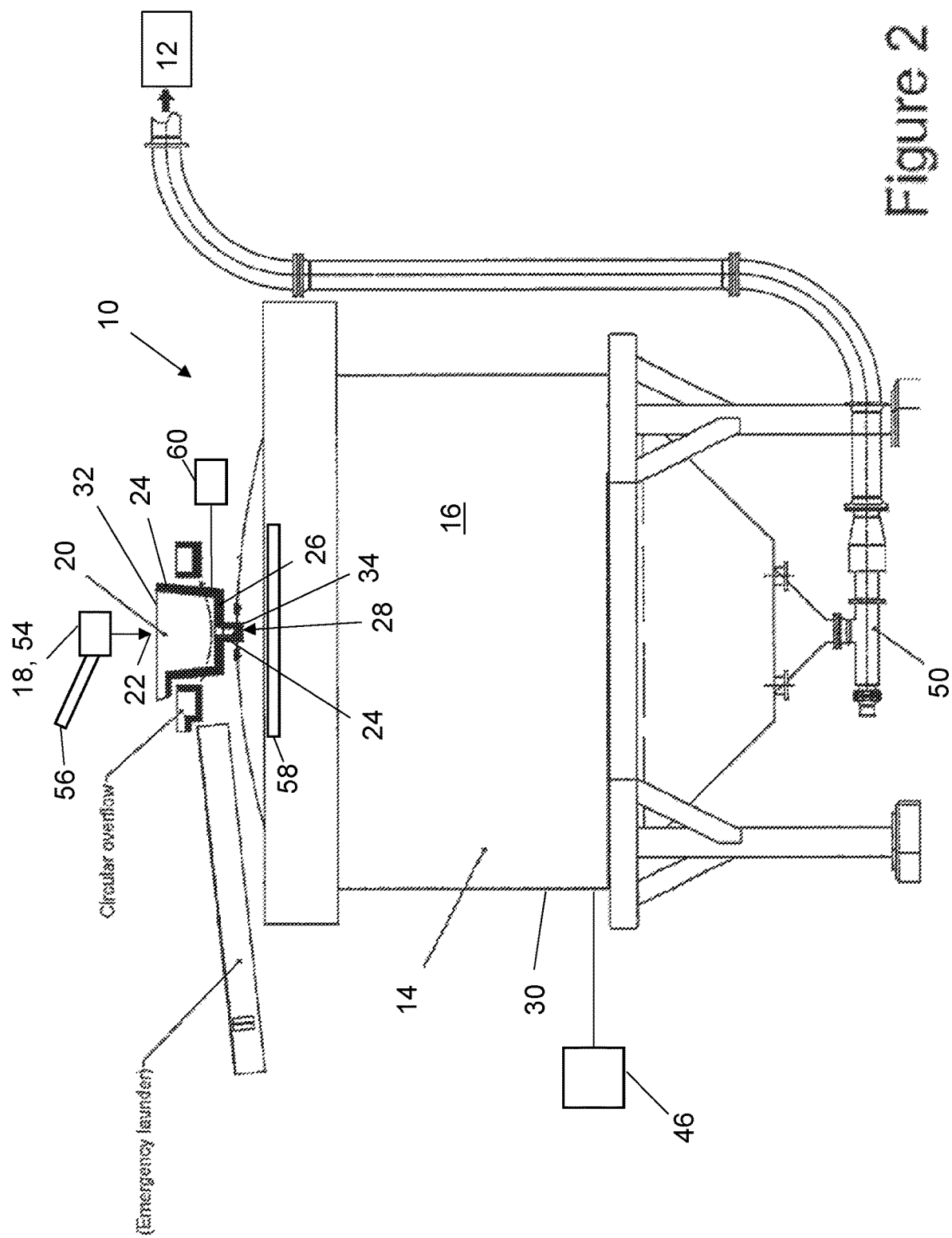
FIG. 2 is a schematic drawing of one embodiment of the present invention in which a rotating tundish is used.

In one embodiment the rotating distributor 20 comprises a tundish 32 and an elongated nozzle 34 attached thereto as shown in FIG. 2.

The elongated nozzle 34 preferably has only one row of openings 28 therein. The basic design of the nozzle 34 is similar to that of an immersion nozzle used for continuous casting of steel.

Figure 7:
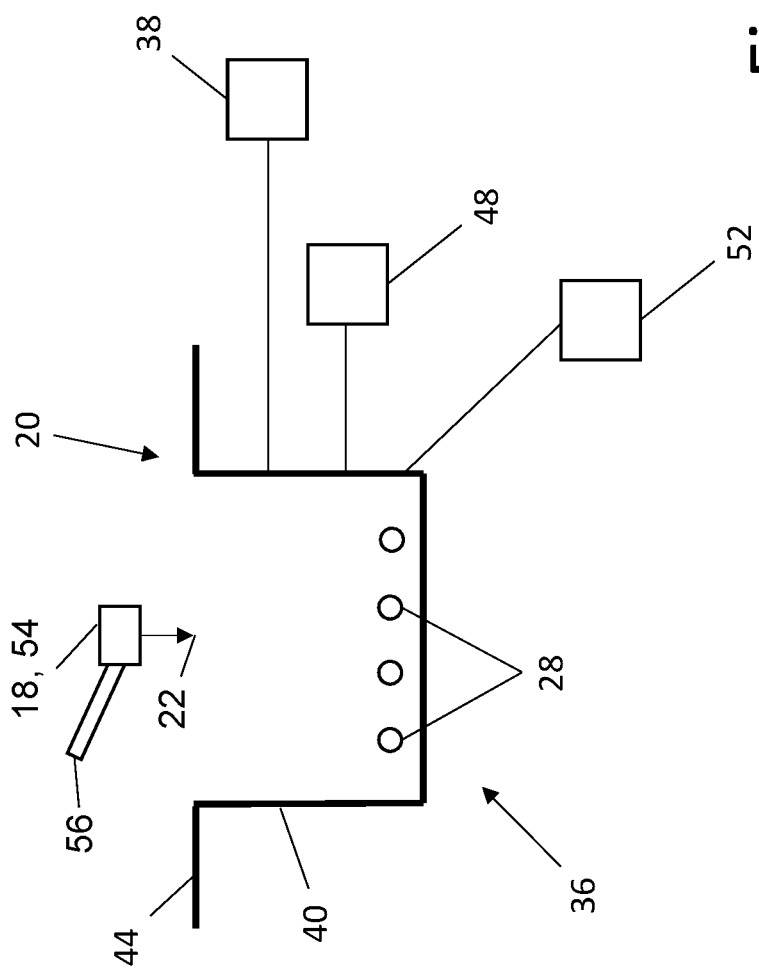
FIG. 7 graphically illustrates a second embodiment of a rotating distributor according to the present invention.
Figure 8:
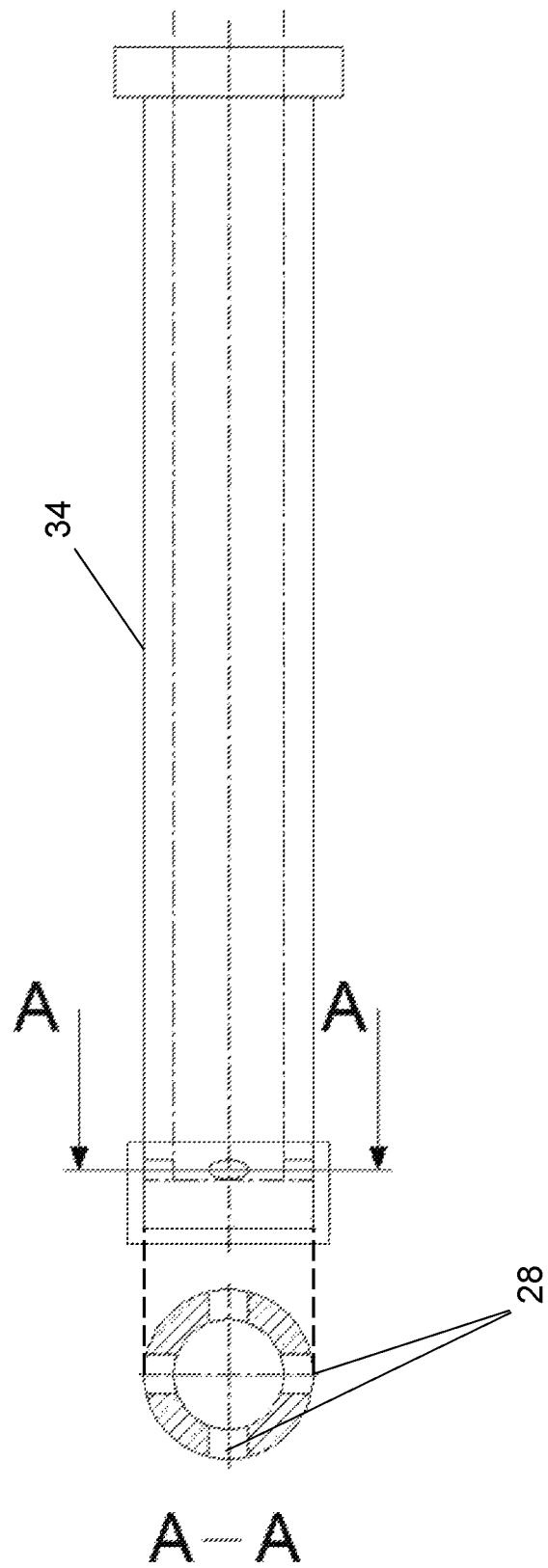
FIG. 8 is a side view of an embodiment of the nozzle according to the present invention.

In another embodiment the rotating distributor 20 comprises a pot 36 attached to a rotating means 38 (a.k.a., a rotator) provided within the tank 14, the rotating pot 36 has cylindrical sidewalls 40 and, preferably, only one row of openings 28 in the sidewalls 40 and optionally an annular top flange 44. This embodiment is illustrated in FIG. 7.

Optionally, the apparatus 10 is provided with at least one of the following features:

- Means for circulating 46 (a.k.a., a stirrer) cooling water in the tank 14, preferably in the same or opposite direction with respect to the rotating means 38.
- Means for adjusting 48 (a.k.a., an adjuster) the height of the rotating distributor 20 in relation to the upper level of the cooling fluid 16 in the cooling tank 14. The height may be fixed or varied during the granulation.
- Means for removing 50 (a.k.a, an extractor or ejector) the granulated material 12 from the cooling tank 14. Preferably, an ejector 50 of the type described in WO2009/157857 is used.
- Means for controlling 52 (a.k.a., a controller) the rotation of the distributor 20 within the range of 1-50 rpm. Any type of motor may be used for this purpose.
- Means for regulating 54 (a.k.a., a regulator) the flow of liquid material from the feeding means 18 to the distributor 20. These means include stopper rods and sliding gates. The regulation can be made manually or fully automatically.
- Circular openings 28 at the lower end of the sidewalls 24 having a diameter of 10-30 mm, preferably 12-20 mm. The size and number of the openings 28 depend on the design capacity, i.e., tonnes per minute.
- Elliptical openings 28 having a height to with ratio (h/w) in the range of from 1:1.2 to 1:10. By adjusting the form of the opening 28, it is possible to adjust the form of the molten stream leaving the distributor 20. A wider opening 28 results in a more film-like stream, thereby the size and shape of the granules may be influenced.
- One row of openings 28 and, preferably, not more than four openings 28 in said single row. This design is the most simple to produce and the method is easy to control. It is therefore a preferred design.
- Openings 28 directed 5°-45° upwards. By this measure it is possible to adjust the path and the time in the air before the stream hits the cooling liquid. Also, the spread of the molten stream over the cooling bath is influenced by the parabolic flight.
- Openings 28 directed 0°-45° downwards. By directing one or more streams downwards it is possible to shorten the flight distance, reduce the risk of disintegration of the steam before it hits the cooling bath and influences the spread over the cooling bath.
- An intermediate receptor or chute 56 for supplying the liquid material to the feeding means 18. This is an alternative design, which can be used. e.g., when the molten alloy is supplied directly from a furnace without being tapped in a ladle.
- A refractory safety plate 58 positioned below the long nozzle 34, which plate 58 spreads the liquid stream over the cooling water surface in case of a nozzle breakage.

According to a preferred embodiment the means for feeding 18 the liquid material to the rotating distributor 20 is positioned above the tank 14, which is provided with cylindrical sidewalls 30. The feeding means 18 is positioned at the centreline of said cylindrical Sidewalls 30, the rotating distributor 20 comprises a circular tundish 32 and an elongated nozzle 34 attached centrally thereto, the elongated nozzle 34 has not more than four circular openings having a diameter of 10-20 mm in one row, optionally there is provided an intermediate receptor or a chute 56 for supplying a controlled amount of liquid material to the tundish 32.

The apparatus 10 may be provided with a weighing system 60 for the tundish 32 that automatically controls the level in the tundish 32 in order to maintain a constant liquid head and thereby a constant flow rate through the nozzle 34. Alternatively, the automatic control system may include optical or electromagnetic sensors.

The method of producing granulated material by disintegrating liquid metal or slag comprises the steps of:
a) providing an apparatus as discussed herein,
b) rotating the distributor 20 at a speed of 1-50 rpm.
c) feeding the molten material to the rotating distributor 20,
d) distributing at least one stream of the molten material over the cooling fluid 16 in the cooling tank 14,
e) disintegrating the molten material above and/or within the cooling liquid 16 and forming at least partly solidified granules 12,
f) recovering the granulated material 12 from the bottom of the cooling tank 14.

In a preferred embodiment the method for producing granulated material 12 comprises at least one of the following features:

- Using water with or without additions as the cooling fluid 16. Water is normally used because of its availability. However, other cooling liquids may be used, in particular cooling liquids of the same type as used for hardening of steel such as higher alcohols like glycols. Naturally, it is possible to mix different additions with water to influence its density, viscosity, heat capacity and/or surface tension.
- Rotating the distributor 20 at a speed of 1-10 rpm. A low rotation speed is easy to control and it would appear to have a positive influence on the confinement of molten stream.
- Feeding the molten material at a rate of 0.5-10 t/min, preferably 1-5 t/min. These feeding rates may be applied in high capacity plants. However, lower feeding rates are possible for small units and for pilot plant applications.
- Circulating cooling water 16 in the tank 14, preferably in the same or opposite direction with respect to the rotating means 38. By controlling the circulation of the cooling water 16 in the tank 14 it is possible to secure a uniform cooling. A water stream that is in the opposite direction to the stream from the rotating distributor 20 results in a higher cooling rate but also to higher drag forces at the liquid interface. Hence, it may be possible to partly influence the geometrical form of the granules 12 by controlling the direction and velocity of the cooling water 16.
- Adjusting the height distance between the cooling water 16 in the tank to the openings 28 in the rotating distributor 20 to be 0.1-1.5 m. This design parameter can be used to adjust the radial distance from the distributor 20 to the annular region, where the molten stream hits the cooling liquid 16 as discussed in EP 402 665.

Controlling the melt level in the tundish 32 and/or in the rotating distributor 20 by controlling the flow from the means for feeding 18 the liquid material to a rotating distributor 20. This is made in order to control the liquid head and thereby also the liquid flow through the nozzle 34.

Controlling the rate of granulation by controlling the level of the melt in the tundish 32 and/or in the rotating distributor 20. This is a convenient method because an increased liquid head results in a higher flow through the nozzle 34.

Recovering the solidified granules 12 by discharging from the lower end of the tank 14 using a water and air ejector. This method is disclosed in WO2009/157857 and is considered to be the most suitable method. However, it is also possible to use other methods for recovering the granulated material 12.

The granulated material 12 is preferably a metal or alloy selected from the group of iron, pig iron, steel, ferroalloy, recycled steel dust, copper, zinc and aluminium.

According to a preferred embodiment, the material to be disintegrated is fed at a rate of 1-5 t/min to a rotating tundish 32 provided with an elongated nozzle 34 having one row of openings 28, wherein the number of openings 28 preferably is 1-4, and the rate of granulation is controlled by controlling the level of melt in the tundish 32.

The granulated material 12 obtained with the inventive method has a narrow size distribution and typically a mean size in the range of 12-50 mm, preferably 15-25 mm and wherein the amount of fines having a size of less than 6 mm can be limited to 5%. The amount of fines having a size of less than 4 mm can be limited to less than 1%.

The invention is not to be seen as limited by the embodiments described above, but can be varied within the scope of the claims, as will be understood by the person skilled in the art.

EXAMPLES

In the following results obtained according to the invention are compared to results obtained with the known apparatus having a flat spray head. In all examples ferronickel was melted in an induction furnace and supplied to the tundish 32 by use of a tapping spout. Tapping temperature was 1650° C. The melt level in the tundish 32 was manually controlled to be 300-400 mm. The nozzle 34 diameter in the tundish 32 was 27 mm. After completed granulation the granules 12 were removed from the tank 14, dried, weighted and subjected to screening. Size classes used were <4 mm, 4-8 mm, 8-12 mm, 12-16 mm, 16-25 mm and >25 mm. The results are given in % of the total weight.

Example 1

In this example the ferronickel contained 32% Ni and 0.1% Si.

The rotating distributor 20 according to the invention had four holes in one single row.

The four openings 28 had a total opening area of 346 mm².

A rotation speed of 3 rpm was used in order to secure an uniform heat dissipation.

The size distribution of the granules 12 obtained according to the invention is disclosed in FIG. 3 (Charge Nr. 108).

The size distribution of the granules 12 obtained with a conventional flat spray head is shown in FIG. 4 (Charge Nr. 110).

It is evident that the inventive apparatus 10 resulted in an improved size distribution in that the amount of fines was reduced, the mean size was increased and the size distribution was improved.

Example 2

In this example the effect of an increased content of Si on the size distribution was examined. The ferronickel contained 32% Ni and 0.27% Si. The granulation conditions were the same as for Example 1.

The size distribution of the granules 12 obtained according to the invention is disclosed in FIG. 5 (Charge Nr. 116).

The size distribution of the granules 12 obtained with a conventional flat spray head is shown in FIG. 6 (Charge Nr. 115).

An improved size distribution was achieved in both cases.

The result for the conventional spray head was as expected, since it is known that Si has a positive influence on the size distribution. A comparison between Charge Nr. 115 and Charge Nr. 110 reveals that the increased Si content resulted in less fines and an improved size distribution.

However, the increased content of Si turned out to have a remarkable effect on the size distribution obtained with inventive apparatus. A comparison of Charge Nr. 116 and Charge Nr. 115 reveals that the amount of fines was virtually eliminated and the mean size of the granules 12 was very much increased.

INDUSTRIAL APPLICABILITY

The invention is particular suited for application in the ferroalloy-, iron- and steel-industries.

The invention claimed is:

1. An apparatus for producing a granulated material having a mean size of at least 5 mm by disintegrating a liquid metal, the apparatus comprising:
 a cooling tank filled with a cooling liquid to a liquid level,
 a rotating distributor positioned above the cooling tank,
 a controller to maintain a rotation of the rotating distributor within a range of 1-50 rpm,
 a feeder feeding the liquid metal to the rotating distributor,
 a regulator to adjust a flow of the liquid metal from the feeder to the rotating distributor, and
 an extractor to remove the granulated material from the cooling tank,
 wherein the rotating distributor comprises an upper inlet opening, sidewalls, a bottom and at least one row of openings at a lower end of the sidewalls, the at least one row of openings having a size of at least 5 mm in the smallest dimension,
 wherein the granulated material comprises fines, and
 wherein an amount of the fines with a size of less than 6 mm is limited to 5%.

2. The apparatus according to claim 1, wherein the feeder is positioned above the cooling tank.

3. The apparatus according to claim 1, wherein the rotating distributor comprises a tundish and an elongated nozzle attached thereto and wherein the elongated nozzle comprises only one row of openings therein.

4. The apparatus according to claim 1, wherein the rotating distributor comprises a pot attached to a rotator within the cooling tank.

5. The apparatus according to claim 1, further comprising at least one selected from a group comprising:

a stirrer to circulate the cooling liquid in the cooling tank, in a same direction or an opposite direction to the rotating distributor, an adjuster to change a height of the rotating distributor in relation to the liquid level of the cooling liquid in the cooling tank, circular openings for the at least one row of openings having diameters of 10-30 mm, circular openings for the at least one row of openings having diameters of 12-20 mm, elliptical openings for the at least one row of openings having a height to width ratio (h/w) in a range of 1:1.2 to 1:10, only one row of the at least one row openings, only one row of the at least one row openings comprising no more than 4 openings, openings in the at least one row of openings directed 0°-45° upwards, openings in the at least one row of openings directed 0°-45° downwards, a chute for supplying the liquid metal to the feeder, a refractory safety plate positioned below a long nozzle to spread the liquid metal over a surface of the cooling liquid in case of a breakage of the long nozzle, a non-metal refractory material forming the rotating distributor, a maximum of 5 rows of the at least one row of openings, a maximum of 3 rows of the at least one row of openings, 1-10 openings in each of the at least one row of openings, and 2-4 openings in each of the at least one row of openings.

6. The apparatus according to claim 1, wherein:

the feeder is positioned above the cooling tank, the cooling tank comprises cylindrical sidewalls, the feeder is positioned at a centerline of the cylindrical sidewalls, the rotating distributor comprises a circular tundish and an elongated nozzle attached centrally thereto, the elongated nozzle has not more than 4 circular openings in one row, where each of the circular openings has a diameter of 10-20 mm, an intermediate receptor or a chute supplies a controlled amount of the liquid metal to the tundish.

7. The apparatus according to claim 6, further comprising a weighing system for the circular tundish that automatically controls a level of the liquid metal in the circular tundish to maintain a constant liquid head and, thereby, a constant flow rate through the elongated nozzle.

8. The apparatus according to claim 2, wherein the cooling tank comprises cylindrical sidewalls and the feeder is positioned at a centerline of the cylindrical sidewalls.

9. The apparatus according to claim 4, wherein the pot comprises cylindrical sidewalls, only one row of openings in the cylindrical sidewalls, and an annular top flange.

\* \* \* \* \*